(12) United States Patent
Cosimini et al.

(10) Patent No.: US 9,565,003 B2
(45) Date of Patent: Feb. 7, 2017

(54) RESOURCE ALLOCATION IN AN OFDM COMMUNICATION SYSTEM

(71) Applicant: VODAFONE IP LICENSING LIMITED, Berkshire (GB)

(72) Inventors: Peter Cosimini, Berkshire (GB); Andrew Dunkin, Berkshire (GB); Paul Edwards, Berkshire (GB)

(73) Assignee: VODAFONE IP LICENSING LIMITED, Berkshire (GB)

( * ) Notice: Subject to any disclaimer, the term of this patent is extended or adjusted under 35 U.S.C. 154(b) by 0 days.

(21) Appl. No.: 14/377,659

(22) PCT Filed: Feb. 8, 2013

(86) PCT No.: PCT/EP2013/052551
§ 371 (c)(1),
(2) Date: Aug. 8, 2014

(87) PCT Pub. No.: WO2013/117702
PCT Pub. Date: Aug. 15, 2013

(65) Prior Publication Data
US 2015/0078269 A1    Mar. 19, 2015

(30) Foreign Application Priority Data
Feb. 8, 2012  (GB) .................. 12154589.1

(51) Int. Cl.
*H04L 5/00*    (2006.01)
(52) U.S. Cl.
CPC ........... *H04L 5/0051* (2013.01); *H04L 5/0064* (2013.01); *H04L 5/006* (2013.01)

(58) Field of Classification Search
CPC ....... H04L 5/0051; H04L 5/0064; H04L 5/006
USPC  370/310, 328, 329, 338, 464, 480; 455/403, 455/422.1
See application file for complete search history.

(56) References Cited

U.S. PATENT DOCUMENTS

| 7,596,080 B2 | 9/2009 | Gerlach |
| 8,400,909 B2 | 3/2013 | Ofuji et al. |
| 2005/0068931 A1* | 3/2005 | Cho et al. ..................... 370/345 |
| 2008/0287068 A1 | 11/2008 | Etemad |

(Continued)

OTHER PUBLICATIONS

International Preliminary Report on Patentability for PCT/EP2013/052551 dated Aug. 21, 2014.

(Continued)

*Primary Examiner* — Obaidul Huq
(74) *Attorney, Agent, or Firm* — B. Aaron Schulman, Esq.; Nicholas Trenkle; Stites & Harbison, PLLC (57) ABSTRACT

To reduce the number of subcarriers used for the transmission of reference symbols by base stations in an OFDM based cellular telecommunications network, the level of data for transmission from the base station to at least one subscriber station is determined and, when traffic levels are low and/or where the mobile station is unable to make efficient use of the full bandwidth, reference symbol data is transmitted from the base station using a number of the subcarriers less than the total number of subcarriers available. Thus the reference symbol frequency spread—the bandwidth between the lowest frequency subcarrier and the highest frequency subcarrier being used to transmit reference symbols—is made dependent upon the determined level of data for transmission.

23 Claims, 5 Drawing Sheets

(56) References Cited

U.S. PATENT DOCUMENTS

| | | |
|---|---|---|
| 2009/0147748 A1 | 6/2009 | Ofuji et al. |
| 2009/0207926 A1* | 8/2009 | Huang et al. ................. 375/260 |
| 2009/0220021 A1 | 9/2009 | Ihm et al. |
| 2009/0268685 A1* | 10/2009 | Chen et al. ................... 370/329 |
| 2010/0246638 A1 | 9/2010 | Mehta et al. |
| 2011/0051711 A1 | 3/2011 | Kishiyama et al. |
| 2012/0099632 A1* | 4/2012 | Bury ............................. 375/224 |

OTHER PUBLICATIONS

Partial European Search Report for EP 12 15 4589 dated Dec. 21, 2012.
European Search Report for 12 15 4589 dated May 15, 2013.
International Search Report for PCT/EP2013/052551 dated May 23, 2013.

* cited by examiner

Fig. 5

RESOURCE ALLOCATION IN AN OFDM COMMUNICATION SYSTEM

TECHNICAL FIELD OF THE INVENTION

The present invention concerns a method of operating a radio network comprising a base station and at least one subscriber station, a base station controller for such a radio network and a corresponding base station.

BACKGROUND TO THE INVENTION

The Third Generation Partnership Project (3GPP) has developed standards for a cellular communications system, referred to as Long Term Evolution (LTE). LTE is based on transmission using Orthogonal Frequency Division Multiplexed (OFDM) signals.

An OFDM signal comprises a plurality of subcarriers, each of which is modulated to carry a transmission symbol. Data for transmission is divided into a plurality of parallel streams, one for each subcarrier. The transmission symbol for each subcarrier is generated by modulating the data using a conventional modulation scheme. Advantageously, OFDM simplifies channel equalisation, by adapting the modulation scheme applied to each sub carrier according to the narrowband propagation conditions for that subcarrier.

In cellular systems, such as LTE, a mobile station estimates the downlink radio channel in order to coherently demodulate information transmitted to it from the base station. In LTE, the base station inserts reference symbols (RS) into the OFDM signal that it transmits. These are used for channel estimation by the mobile stations. At least one cell-specific reference symbol is transmitted by a base station in a given time period.

3GPP standard TS 36.211 Release 9 defines the transmission of reference symbols in the downlink. The reference symbols are transmitted over the full downlink channel bandwidth for the cell covered by the base station. Mobile stations measure the reference symbols transmitted by the base station providing them with service. They additionally measure the reference symbols transmitted by other base stations. This is useful for handover purposes, when moving between cells covered by different base stations.

A mobile station can also use the reference symbols to estimate the channel for resource blocks (that is, transmission symbols allocated to a specific subcarrier) that are not being used to receive data. This information is reported to the base station and typically used by it to schedule downlink resources optimally to mobile stations.

When there is insufficient data to fill the capacity of the OFDM downlink signal, it is desirable to improve the efficiency of the transmission without reducing the link quality for any subscriber stations.

SUMMARY OF THE INVENTION

Against this background, in a first aspect, there is provided a method of operating a radio network comprising a base station and at least one subscriber station, the method comprising: determining a level of data for transmission from the base station to the at least one subscriber station; and transmitting data from the base station using a first Orthogonal Frequency Division Multiplexed, OFDM, signal comprising subcarriers, a number of the subcarriers being used to transmit reference symbols, the bandwidth between the lowest frequency subcarrier being used to transmit reference symbols and the highest frequency subcarrier being used to transmit reference symbols defining a reference symbol frequency spread. The reference symbol frequency spread is established on the basis of the determined level of data for transmission.

In this way, the number of subcarriers used for transmission of the reference symbols is reduced. Moreover, the bandwidth of transmission for the reference symbols is correspondingly decreased. This results in a power saving when low data traffic to subscriber or mobile stations is desirable.

In a second aspect, there is provided a method of operating a radio network comprising a base station and at least one subscriber station, the method comprising: configuring the base station to transmit Orthogonal Frequency Division Multiplexed, OFDM, signals, the signals being arranged to comprise a predetermined number of subcarriers, $N_{sc(max)}$, arranged about a central frequency; determining a level of data for transmission from the base station to the at least one subscriber station; and transmitting data from the base station using OFDM signals comprising a number of utilised subcarriers, $N_{sc}$, arranged about the central frequency. The number of utilised subcarriers, $N_{sc}$, is determined on the basis of the determined level of data for transmission and is less than the predetermined number of subcarriers, $N_{sc(max)}$.

Using this approach reduces the total transmission power by adjusting the transmission bandwidth according to the data traffic rate for transmission to subscriber or mobile stations.

Optionally, the step of transmitting data from the base station comprises transmitting a first OFDM signal, a number of the subcarriers being used to transmit reference symbols, the bandwidth between the lowest frequency subcarrier being used to transmit reference symbols and the highest frequency subcarrier being used to transmit reference symbols defining a reference symbol frequency spread, and the reference symbol frequency spread is established on the basis of the determined level of data for transmission.

In either the first or second aspects, a number of different optional features may be employed. Preferably, the number of subcarriers being used to transmit reference symbols is established on the basis of the determined level of data for transmission. The number of subcarriers can define the reference symbol frequency spread in this way.

Optionally, the first OFDM signal has a central frequency and wherein the number of subcarriers used to transmit reference symbols above the reference frequency and the number of subcarriers used to transmit reference symbols below the reference frequency are the same. This may imply that the reference symbols are transmitted in the central portion of the full OFDM signal bandwidth.

Optionally, the first OFDM signal is transmitted using a first antenna. Then, the method may further comprise: transmitting a second OFDM signal from a second antenna, the second OFDM signal comprising subcarriers, a number of the subcarriers being used to transmit reference symbols, the reference symbol frequency spread for the second OFDM signal being established on the basis of the determined level of data for transmission. Advantageously, the subcarriers used to transmit reference symbols in the first OFDM signal are different from the subcarriers used to transmit reference symbols in the second OFDM signal.

In one embodiment, the step of determining a level of data for transmission from the base station to the at least one subscriber station comprises receiving data at the base station for transmission to the at least one subscriber station and determining the level of data based on the received data.

This may mean that the quantity of data for transmission is measured and the reference symbol bandwidth is adjusted accordingly.

Additionally or alternatively, the step of determining a level of data for transmission from the base station to the at least one subscriber station comprises predicting a future level of data for transmission to the at least one subscriber station. A model may be used for such predictions, optionally together with information about previous data transmissions.

In the preferred embodiment, the method may further comprise: receiving at the subscriber station the reference symbols transmitted by the base station; and using the received reference symbols to estimate the channel.

Beneficially, the step of transmitting data from the base station comprises transmitting subcarriers with a predetermined frequency spacing between subcarriers.

In a third aspect, there is provided a method of operating a base station by transmitting an Orthogonal Frequency Division Multiplexed, OFDM, signal, in which some of the subcarriers are used for transmission of reference symbols, the reference symbol subcarriers being limited to a specified bandwidth in a central portion of the OFDM signal bandwidth, the specified bandwidth being based on a determined level of data traffic for station to one or more subscriber stations from the base station.

In another aspect, the invention may be found in a computer readable medium having a computer program operable to carry of the method as herein described recorded thereon.

In a further aspect, there is provided a base station controller, comprising: a processor, arranged to determine a level of data for transmission from the base station to the at least one subscriber station; and a transmission controller, arranged to configure a transmitter in the base station to transmit data using a first Orthogonal Frequency Division Multiplexed, OFDM, signal comprising subcarriers, a number of the subcarriers being used to transmit reference symbols, the bandwidth between the lowest frequency subcarrier being used to transmit reference symbols and the highest frequency subcarrier being used to transmit reference symbols defining a reference symbol frequency spread. The transmission controller is further arranged to establish the reference symbol frequency spread on the basis of the determined level of data for transmission.

In a yet further aspect, there is provided a base station controller, comprising: a transmission controller arranged to configure the base station to transmit Orthogonal Frequency Division Multiplexed, OFDM, signals, the signals being arranged to comprise a predetermined number of subcarriers, $N_{sc(max)}$, arranged about a central frequency; and a processor, configured to determine a level of data for transmission from the base station to the at least one subscriber station. The transmission controller is further arranged to configure a transmitter in the base station to transmit data using OFDM signals comprising a number of utilised subcarriers, $N_{sc}$, arranged about the central frequency, the number of utilised subcarriers, $N_{sc}$, being determined on the basis of the determined level of data for transmission and being less than the predetermined number of subcarriers, $N_{sc(max)}$.

Optionally, the transmission controller is further arranged to configure the transmitter to transmit the first OFDM signal such that a number of the subcarriers are used to transmit reference symbols, the bandwidth between the lowest frequency subcarrier being used to transmit reference symbols and the highest frequency subcarrier being used to transmit reference symbols defining a reference symbol frequency spread. Further optionally, the reference symbol frequency spread is established on the basis of the determined level of data for transmission.

Preferably, the transmission controller is further arranged to establish the number of subcarriers being used to transmit reference symbols on the basis of the determined level of data for transmission.

Optionally, the transmission controller is further arranged to configure the transmitter such that the first OFDM signal has a central frequency and wherein the number of subcarriers used to transmit reference symbols above the reference frequency and the number of subcarriers used to transmit reference symbols below the reference frequency are the same.

Advantageously, the transmission controller is further arranged to configure the transmitter such that the first OFDM signal is transmitted using a first antenna, to transmit a second OFDM signal from a second antenna, the second OFDM signal comprising subcarriers, a number of the subcarriers being used to transmit reference symbols and the reference symbol frequency spread for the second OFDM signal being established on the basis of the determined level of data for transmission. Optionally, the subcarriers then used to transmit reference symbols in the first OFDM signal are different from the subcarriers used to transmit reference symbols in the second OFDM signal.

In one embodiment, the processor is configured to determine a level of data for transmission from the base station to the at least one subscriber station by determining a level of data received at the base station for transmission to the at least one subscriber station.

Additionally or alternatively, the processor is configured to determine a level of data for transmission from the base station to the at least one subscriber station by predicting a future level of data for transmission to the at least one subscriber station.

Beneficially, the transmission controller is arranged to configure the transmitter to transmit the OFDM signal with a predetermined frequency spacing between subcarriers.

Further provided is a base station, comprising: a transmitter, configured for communication with at least one subscriber station; and a base station controller, as described herein.

BRIEF DESCRIPTION OF THE DRAWINGS

The invention may be put into practice in various ways, a number of which will now be described by way of example only and with reference to the accompanying drawings in which.

DETAILED DESCRIPTION OF PREFERRED EMBODIMENTS

For the purposes of this description, the terms mobile station and base station have been used. The term mobile station is equivalent to the term User Equipment (UE) employed in 3GPP standards or the term subscriber station. The term base station can be considered equivalent to the term eNodeB or cell used in 3GPP standards, although it is recognised that the eNodeB and cell are separate devices in the LTE system.

Figure 1:
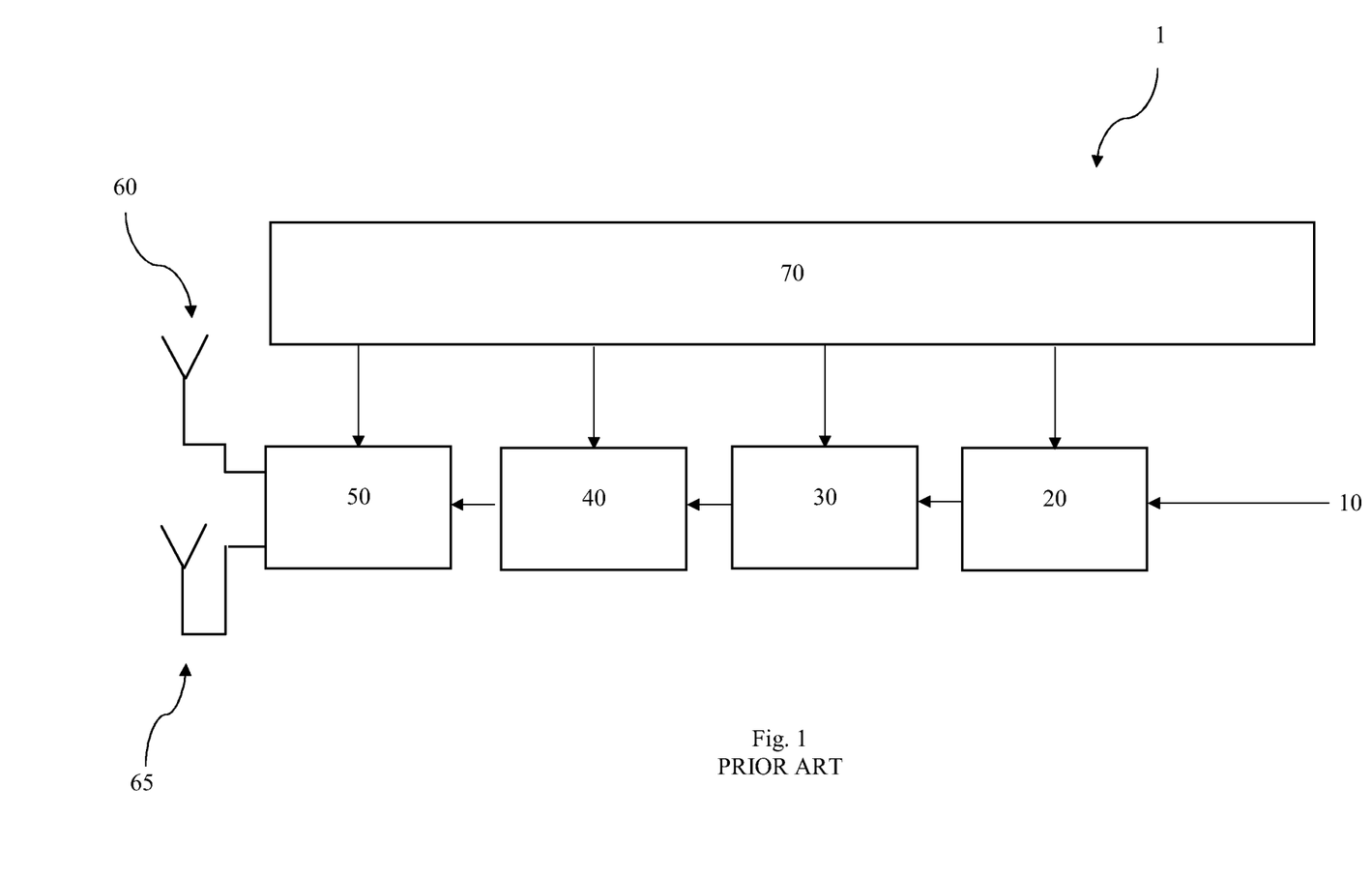
FIG. 1 shows an exemplary base station for an LTE system according to the prior art, but suitable for use with the present invention.

Referring first to FIG. 1, there is shown an example of a base station according to the prior art, for use with the present invention. This is based on the description and drawings shown in 3GPP standard TS 36.302 Release 9 in section 6.2. The base station 1 comprises: a data input 10; a coding block 20; a data modulation block 30; a resource mapping block 40; an antenna mapping block 50; a first transmission antenna 60; a second transmission antenna 65; and a media access control (MAC) scheduler 70.

Data for transmission arrives at data input 10 and is divided into transport blocks. Channel coding is then applied to each of the transport blocks by coding block 20. This provides redundancy to improve error correction. The coded data is then modulated by data modulation block 30 to generate a plurality of transmission symbols. The transmission symbols are mapped for transmission by specific subcarriers at specific times in resource mapping block 40. This block also handles power allocation. The allocated resources are then passed to antenna mapping block 50, which allocates transmission of resources between multiple antennas, specifically first antenna 60 and second antenna 65.

The MAC scheduler 70 receives channel state information and controls the modulation schemes applied by data modulation block 30, the allocation of transmission symbols to subcarriers, timing and power by resource mapping block 40 and the allocation of resources to antennas by antenna mapping block 50. The MAC Scheduler 70 is embodied in software operating on a processor, although it may alternatively comprise a dedicated processor.

Figure 2:
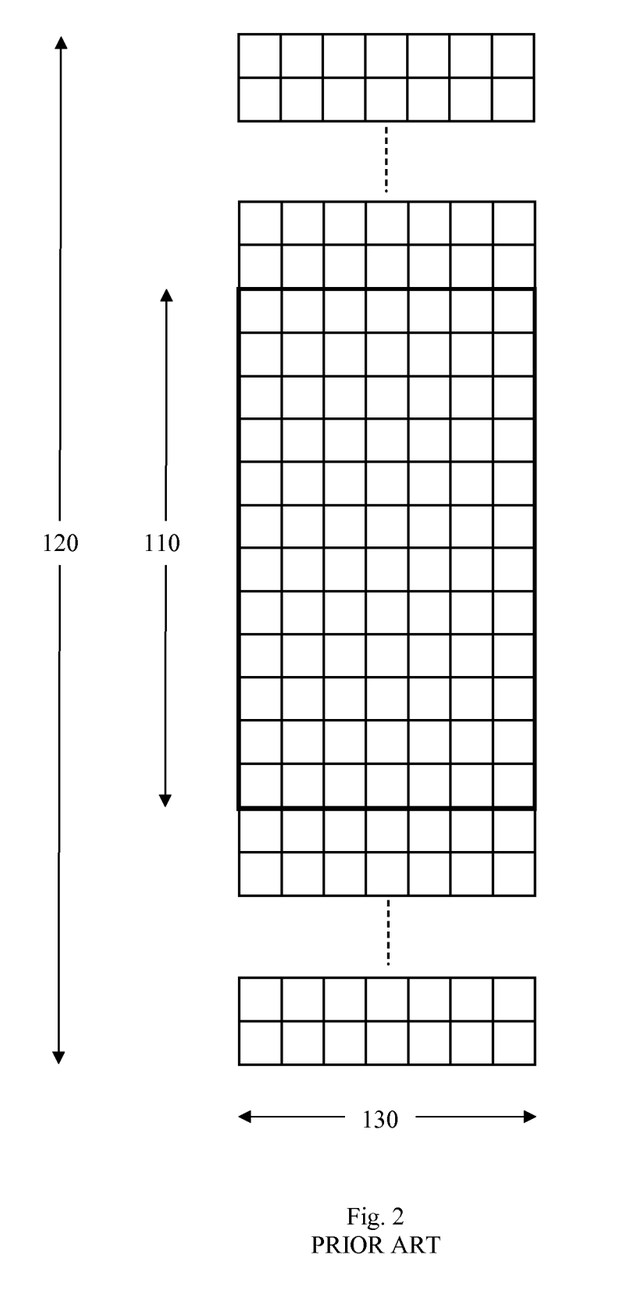
FIG. 2 illustrates allocation of resources for transmission by the base station of FIG. 1 according to the prior art.

Referring next to FIG. 2 there is shown an illustration of the resource allocation for transmission of OFDM signals by the bass station on FIG. 1. This illustration is based on the drawing shown in 3GPP technical standard TS 36.211 Release 9 in section 6.2.

The OFDM signal is divided into subcarriers, which are sped across the bandwidth of the signal with a fixed frequency spacing between each subcarrier. The subcarriers are illustrated schematically along the vertical access in FIG. 2 and a resource block comprises a plurality of subcarriers. The resource block bandwidth 110 shows the number of subcarriers in a resource block. The OFDM transmission comprises at least one resource block and typically comprises multiple resource blocks. Bandwidth 120 represents the total number of subcarriers transmitted in the OFDM signal.

In a time slot, each sub carrier carries a plurality of transmission symbols. Each transmission symbol comprises modulated data, using a modulation scheme such as Binary Phase-Shift Keying (BPSK) or Quadrature Amplitude Modulation (QAM). The time slot length 130 depicts the number of transmission symbols in a time slot. A frame is 20 time slots in duration and the start and end times of a frame are defined by means of synchronisation signals.

Reference symbols are allocated for transmission in a specific transmission symbol by specific subcarriers. Where the base station transmits from more than one antenna, reference symbols are transmitted on each of the antennas. However, the reference symbols for one antenna are transmitted at different times and on different subcarriers in comparison with the reference symbols for other antennas. This enables the mobile stations to estimate and measure the channel from each antenna.

Figure 3:
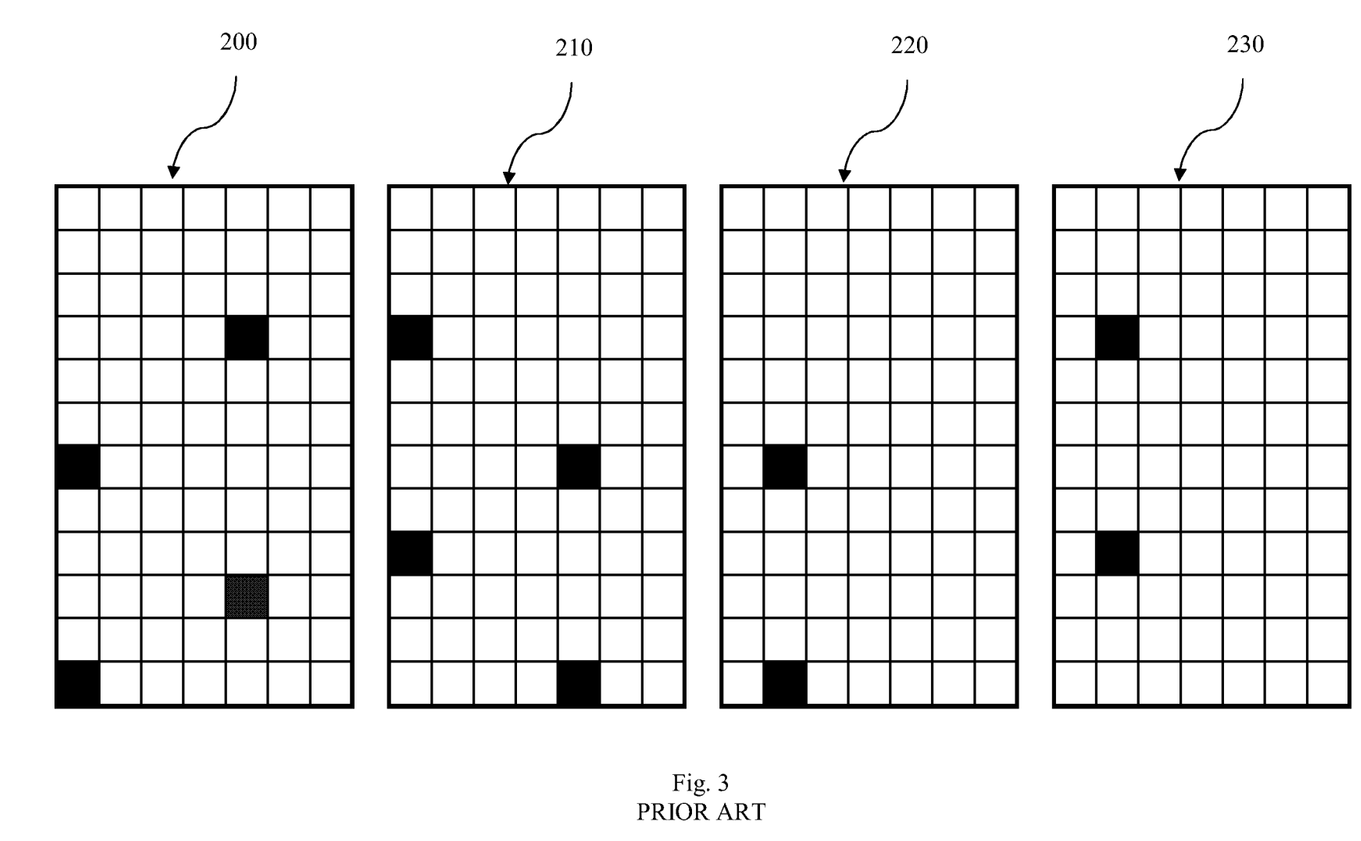
FIG. 3 schematically shows the allocation of resources for reference symbol transmission between multiple antennas according to the prior art.

Referring now to FIG. 3, there is shown an illustration of the allocation of reference symbols for transmission in the downlink using multiple antennas. This illustration is based upon the drawings shown in 3GPP standard TS 36.211 Release 9 under section 6.10. A first resource block 200 is allocated for transmission by a first antenna. A second resource block 210 is allocated for transmission by a second antenna. A third resource block 220 is allocated to a transmission by a third antenna, where a third antenna is used. A fourth resource block 230 is allocated for transmission by a fourth antenna, where a fourth antenna is used. The shaded transmission symbols illustrate the allocation of subcarriers and transmission symbol timings for reference symbols in respect of each antenna. It will be noted that the transmission symbol used for a reference symbol in respect of one antenna is not used for transmission of a reference symbol in respect of any other antenna.

As mentioned previously, according to 3GPP Release 9 technical standards, cell-specific reference symbols are transmitted in every downlink sub-frame on every antenna and cover the full downlink channel bandwidth for the cell. This is the case, even when no traffic exists. It has now been recognised that these signals represent a significant overhead in terms of transmission power and power consumption.

Figure 4:
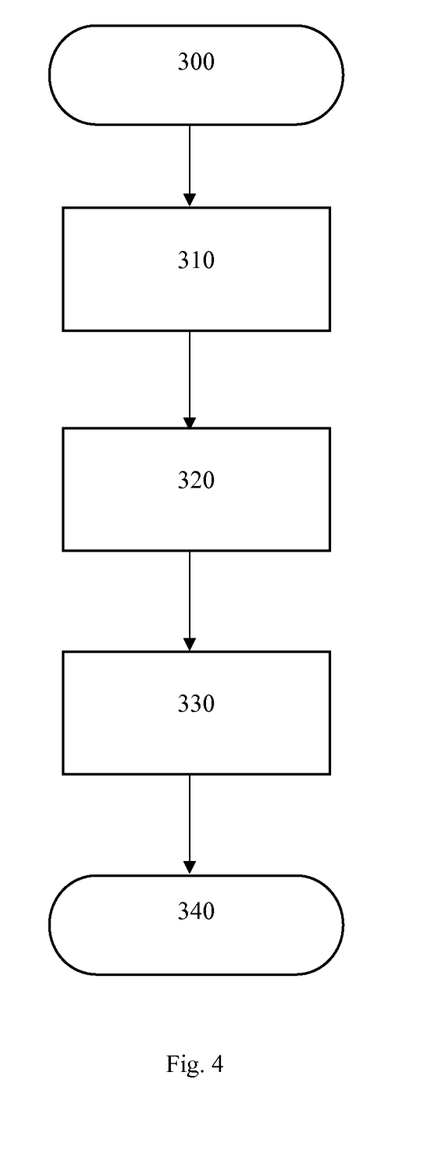
FIG. 4 shows a flowchart for a first example of the implementation of the present invention.

Referring now to FIG. 4, there is shown a flowchart of a first method according to the present invention. In a first step 300 of the flowchart, the process is started. In a second step 310, a level of data for transmission from the base station to the at least one subscriber station is determined. Then, in a third step 320, a frequency spread for the reference symbols is established on the basis of the determined level of data for transmission. The frequency spread defines the difference in frequency (that is, bandwidth) between the highest frequency subcarrier being used to transmit reference symbols and the lowest frequency subcarrier being used to transmit reference symbols. The determined level of data for transmission may be the offered traffic or a potential cell throughput, for instance determined by predictive traffic analysis. This step is carried out by the MAC scheduler 70.

In fourth step 330, data is transmitted from the base station using an OFDM signal. A number of the subcarriers of this signal are used to transmit reference symbols, using the reference symbol frequency spread defined in third step 320. The restriction may be implemented for one or all of the base station antennas. In fifth step 340, the process is ended.

In other words, the transmission of the cell-specific reference symbols is restricted to a central portion of the full channel bandwidth. This occurs when traffic levels are low or the full channel bandwidth is not being utilised or in situations where mobile stations cannot efficiently utilise the full channel bandwidth due to for example coverage reasons or mobile station capabilities. The full channel bandwidth is that available for transmitting downlink data to mobile stations, when all subcarriers are being used.

It should be noted that, for LTE, reference symbol sequences are defined from the centre of the channel bandwidth independently of the specified channel bandwidths. The 3GPP Release 9 standard specify that reference symbols be transmitted in a certain central portion of the channel to enable the mobile stations to receive basic system information in broadcast control channels.

Using the above method the base station can add or remove reference symbols from the edges of the channel bandwidth, thereby only transmitting the reference symbols on a limited central portion of the channel bandwidth used to transmit data to mobile stations, depending on either the offered traffic or potential cell throughput.

Figure 5:
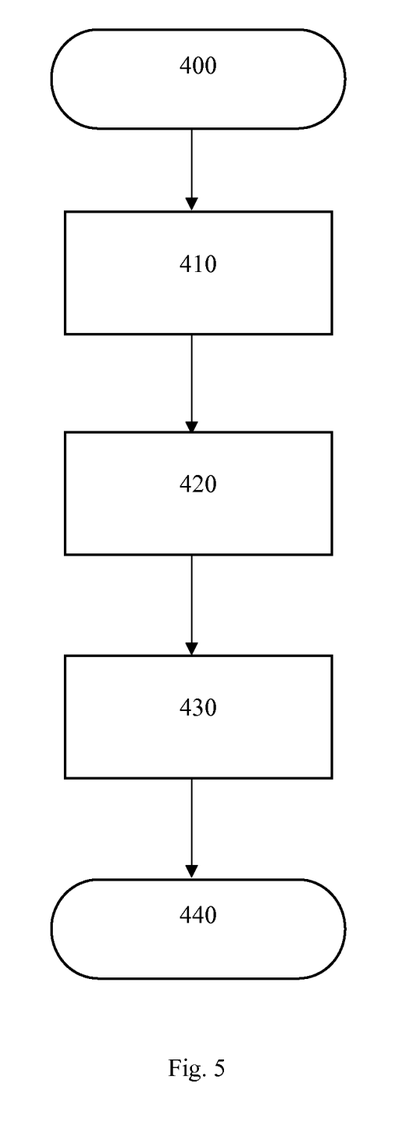
FIG. 5 shows a flowchart for a second example of the implementation of the present invention

Referring now to FIG. 5, there is shown a flowchart of a second method according to the present invention. In a first step 400 of the flowchart, the process is started. In a second step 410, a level of data for transmission from the base station to the at least one subscriber station is determined. Then, in a third step 420, a bandwidth for the OFDM signal for transmission is established on the basis of the determined level of data for transmission. The bandwidth for transmission defines the number of subcarriers required. Again, the determined level of data for transmission may be the offered traffic or a potential cell throughput, for instance determined by predictive traffic analysis.

The base station transmitter is configured to be able to transmit a maximum number of subcarriers, $N_{sc(max)}$. As illustrated in FIG. 2, these are arranged about a central frequency, which at baseband may be zero and when transmitted is the central up-conversion frequency. The number of utilised subcarriers, $N_{sc}$, is determined in third step 420. The subcarriers are nevertheless arranged about the central frequency. The number of utilised subcarriers, $N_{sc}$, is less than the maximum number of subcarriers, $N_{sc(max)}$.

This may be implemented by identifying the number of resource blocks required, as illustrated in FIG. 2. This step is carried out by the MAC scheduler 70. In other words, the actual channel bandwidth is reduced by this approach. For example, the bandwidth may be one of: 1.4 MHz; 3 MHz; 5 MHz; 10 MHz; 15 MHz; and 20 MHz. The restriction may be implemented for one or all of the base station antennas.

This approach allows a power saving with potentially lower granularity than adjusting the number of subcarriers used for reference symbols. In some embodiments, dynamic changes in system configuration such as channel bandwidth may not be possible without re-starting the base station.

In fourth step 430, data is transmitted from the base station using an OFDM signal, comprising the number of subcarriers determined in the third step 420. In fifth step 440, the process is ended.

The skilled person will be aware that various modifications to the above identified embodiments can be made. For example, the base station can use only one antenna, or use more than two antennas. Also, the base station may be designed differently, whilst still delivering the same transmission signals. Where the base station uses only one antenna, antenna mapping block 50 may not be necessary.

Although the invention is described with reference to an LTE system, it will be understood that it is applicable to other radio-based systems, such as IEEE 802.16 (WiMax).

The invention claimed is:

1. A method of operating a radio network comprising a base station and at least one subscriber station, the method comprising:
   determining a level of data traffic for transmission from the base station to the at least one subscriber station; and
   transmitting data from the base station using a first Orthogonal Frequency Division Multiplexed (OFDM) signal comprising subcarriers, a number of the subcarriers being used to transmit reference symbols, a bandwidth between the lowest frequency subcarrier being used to transmit reference symbols and the highest frequency subcarrier being used to transmit reference symbols defining a reference symbol frequency spread; and
   wherein the reference symbol frequency spread is established based on the determined level of data traffic for transmission.

2. The method of claim 1, wherein the number of subcarriers being used to transmit reference symbols is established on the basis of the determined level of data traffic for transmission.

3. The method of claim 1, wherein the first OFDM signal has a central frequency and wherein the number of subcarriers used to transmit reference symbols above the reference frequency and the number of subcarriers used to transmit reference symbols below the reference frequency are the same.

4. The method of claim 1, wherein the first OFDM signal is transmitted using a first antenna, and wherein the method further comprises:
   transmitting a second OFDM signal from a second antenna, the second OFDM signal comprising subcarriers, a number of the subcarriers being used to transmit reference symbols, the reference symbol frequency spread for the second OFDM signal being established on the basis of the determined level of data traffic for transmission.

5. The method of claim 4, wherein the subcarriers used to transmit reference symbols in the first OFDM signal are different from the subcarriers used to transmit reference symbols in the second OFDM signal.

6. The method of claim 1, wherein the step of determining a level of data traffic for transmission from the base station to the at least one subscriber station comprises receiving data at the base station for transmission to the at least one subscriber station and determining the level of data based on the received data.

7. The method of claim 1, wherein the step of determining a level of data traffic for transmission from the base station to the at least one subscriber station comprises predicting a future level of data traffic for transmission to the at least one subscriber station.

8. The method of claim 1, further comprising:
   receiving at the subscriber station the reference symbols transmitted by the base station; and
   using the received reference symbols to estimate the channel.

9. The method of claim 1, wherein the step of transmitting data from the base station comprises transmitting subcarriers with a predetermined frequency spacing between subcarriers.

10. A non-transitory computer-readable storage medium having program code embodied thereon, the program code executable by a processor to implement the method of claim 1.

11. A method of operating a radio network comprising a base station and at least one subscriber station, the method comprising:
   configuring the base station to transmit Orthogonal Frequency Division Multiplexed, OFDM, signals, the signals being arranged to comprise a predetermined number of subcarriers, $N_{sc(max)}$, arranged about a central frequency;
   determining a level of data traffic for transmission from the base station to the at least one subscriber station; and
   transmitting data from the base station using OFDM signals comprising a number of utilised subcarriers, $N_{sc}$, arranged about the central frequency; and wherein the number of utilised subcarriers, $N_{sc}$, is determined based on the determined level of data traffic for transmission and is less than the predetermined number of subcarriers, $N_{sc(max)}$.

12. The method of claim 11:
wherein the step of transmitting data from the base station comprises transmitting a first OFDM signal, a number of the subcarriers being used to transmit reference symbols, a bandwidth between the lowest frequency subcarrier being used to transmit reference symbols and the highest frequency subcarrier being used to transmit reference symbols defining a reference symbol frequency spread; and
wherein the reference symbol frequency spread is established on the basis of the determined level of data traffic for transmission.

13. A base station controller, comprising:
a processor, arranged to determine a level of data traffic for transmission from the base station to the at least one subscriber station; and
a transmission controller, arranged to configure a transmitter in the base station to transmit data using a first Orthogonal Frequency Division Multiplexed, OFDM, signal comprising subcarriers, a number of the subcarriers being used to transmit reference symbols, a bandwidth between the lowest frequency subcarrier being used to transmit reference symbols and the highest frequency subcarrier being used to transmit reference symbols defining a reference symbol frequency spread; and
wherein the transmission controller is further arranged to establish the reference symbol frequency spread based on the determined level of data traffic for transmission.

14. The base station controller of claim 13, wherein transmission controller is further arranged to establish the number of subcarriers being used to transmit reference symbols on the basis of the determined level of data traffic for transmission.

15. The base station controller of claim 13, wherein the transmission controller is further arranged to configure the transmitter such that the first OFDM signal has a central frequency and wherein the number of subcarriers used to transmit reference symbols above the reference frequency and the number of subcarriers used to transmit reference symbols below the reference frequency are the same.

16. The base station controller of claim 13, wherein the transmission controller is further arranged to configure the transmitter such that the first OFDM signal is transmitted using a first antenna, to transmit a second OFDM signal from a second antenna, the second OFDM signal comprising subcarriers, a number of the subcarriers being used to transmit reference symbols and the reference symbol frequency spread for the second OFDM signal being established on the basis of the determined level of data traffic for transmission.

17. The base station controller of claim 16, wherein the OFDM signal are different from the subcarriers used to transmit reference symbols in the second OFDM signal.

18. The base station controller of claim 13, wherein the processor is configured to determine the level of data traffic for transmission from the base station to the at least one subscriber station by determining a level of data traffic received at the base station for transmission to the at least one subscriber station.

19. The base station controller of claim 13, wherein the processor is configured to determine a level of data traffic for transmission from the base station to the at least one subscriber station by predicting a future level of data traffic for transmission to the at least one subscriber station.

20. The base station controller of claim 13, wherein the transmission controller is arranged to configure the transmitter to transmit the OFDM signal with a predetermined frequency spacing between subcarriers.

21. A base station, comprising:
a transmitter, configured for communication with at least one subscriber station; and
a base station controller, according to claim 13.

22. A base station controller, comprising:
a transmission controller arranged to configure the base station to transmit Orthogonal Frequency Division Multiplexed, OFDM, signals, the signals being arranged to comprise a predetermined number of subcarriers, $N_{sc(max)}$, arranged about a central frequency; and
a processor, configured to determine a level of data traffic for transmission from the base station to the at least one subscriber station; and
wherein the transmission controller is further arranged to configure a transmitter in the base station to transmit data using OFDM signals comprising a number of utilised subcarriers, $N_{sc}$, arranged about the central frequency, the number of utilised subcarriers, $N_{sc}$, being determined based on the determined level of data traffic for transmission and being less than the predetermined number of subcarriers, $N_{sc(max)}$.

23. The base station controller of claim 22:
wherein transmission controller is further arranged to configure the transmitter to transmit the first OFDM signal a number of the subcarriers are used to transmit symbols, a bandwidth between the lowest subcarrier being used to transmit reference symbols and the highest frequency subcarrier being used to transmit reference symbols defining a reference symbol frequency spread; and
wherein the reference symbol frequency spread is established on the basis of the determined level of data traffic for transmission.

* * * * *